US010790718B2

(12) United States Patent
Fujimoto et al.

(10) Patent No.: US 10,790,718 B2
(45) Date of Patent: Sep. 29, 2020

(54) ELECTRIC MOTOR HAVING STATOR WITH SOLDER LAYER ON ALUMINUM EXPOSED PORTION OF TERMINAL WIRE AND METHOD OF MANUFACTURING ELECTRIC MOTOR (71) Applicant: Mitsubishi Electric Corporation, Tokyo (JP)

(72) Inventors: Kazuki Fujimoto, Tokyo (JP); Hiroshi Yamanaka, Tokyo (JP); Hironori Yabuuchi, Tokyo (JP); Ryo Nabika, Tokyo (JP); Yukie Yamakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 482 days.

(21) Appl. No.: 15/523,699

(22) PCT Filed: Nov. 27, 2014

(86) PCT No.: PCT/JP2014/081342
§ 371 (c)(1),
(2) Date: May 2, 2017

(87) PCT Pub. No.: WO2016/084184
PCT Pub. Date: Jun. 2, 2016

(65) Prior Publication Data
US 2017/0317550 A1 Nov. 2, 2017

(51) Int. Cl.
H02K 3/50 (2006.01)
H02K 15/00 (2006.01)
(Continued)

(52) U.S. Cl.
CPC ............... *H02K 3/50* (2013.01); *H02K 3/522* (2013.01); *H02K 15/0062* (2013.01); *H02K 15/0068* (2013.01); *H02K 3/02* (2013.01)

(58) Field of Classification Search
CPC ........ H02K 3/04–28; H02K 3/30; H02K 3/32; H02K 3/50; H02K 3/522; H01R 4/62
(Continued)

(56) References Cited

U.S. PATENT DOCUMENTS 2,815,430 A * 12/1957 Weiss ....................... B23K 1/06
219/230
6,281,443 B1 * 8/2001 Idler ..................... H01B 7/0807
174/110 R
(Continued)

FOREIGN PATENT DOCUMENTS

JP 07-11862 U 2/1995
JP 2001-211594 A 8/2001
(Continued)

OTHER PUBLICATIONS

Office action dated Mar. 27, 2018 issued in corresponding JP patent application No. 2016-561156 (and English translation thereof).
(Continued)

*Primary Examiner* — John K Kim
*Assistant Examiner* — Minki Chang
(74) *Attorney, Agent, or Firm* — Posz Law Group, PLC (57) ABSTRACT An electric motor includes a stator around which an aluminum wire having a resin coating layer formed on a surface of the aluminum wire is wound; and a rotator arranged on an inner side of the stator to be rotatable, the aluminum wire comprising a terminal wire including an aluminum exposed portion, from which the resin coating layer is peeled off to expose an aluminum core wire, the stator comprising a terminal with which the aluminum exposed portion and a power supply wire for use in supplying electric power for rotating the rotator are connected, the terminal electrically conducting the aluminum exposed portion and the power supply wire, and a first solder layer formed on the terminal,
(Continued)

covering an entire surface of the aluminum exposed portion, and joining the aluminum exposed portion and the terminal to each other.

19 Claims, 5 Drawing Sheets

(51) Int. Cl.
*H02K 3/52* (2006.01)
*H02K 3/02* (2006.01)

(58) Field of Classification Search
USPC .......................................... 310/71, 179–215
See application file for complete search history.

(56) References Cited

U.S. PATENT DOCUMENTS

| | | | | |
|---|---|---|---|---|
| 2007/0048172 | A1* | 3/2007 | Huang | B23K 35/262 420/557 |
| 2007/0210656 | A1 | 9/2007 | Lafontaine et al. | |
| 2008/0129131 | A1* | 6/2008 | Shin | H02K 3/18 310/71 |
| 2011/0037331 | A1* | 2/2011 | Jang | H02K 3/522 310/71 |
| 2013/0033352 | A1* | 2/2013 | Wo | H01F 27/327 336/192 |
| 2013/0040511 | A1* | 2/2013 | Takashima | H01R 4/024 439/882 |
| 2015/0187462 | A1* | 7/2015 | Kondo | H01R 4/023 310/71 |
| 2017/0033620 | A1* | 2/2017 | Saint-Michel | H02K 1/27 |

FOREIGN PATENT DOCUMENTS

| | | |
|---|---|---|
| JP | 2009-070863 A | 4/2009 |
| JP | 2012-099219 A | 5/2012 |
| JP | 2012-213321 A | 11/2012 |
| JP | 2013-080682 A | 5/2013 |
| JP | 2013-105648 A | 5/2013 |
| JP | 2013-207964 A | 10/2013 |
| JP | 2014-112509 A | 6/2014 |

OTHER PUBLICATIONS

International Search Report of the International Searching Authority dated Feb. 10, 2015 for the corresponding international application No. PCT/JP2014/081342 (and English translation).

\* cited by examiner

ELECTRIC MOTOR HAVING STATOR WITH SOLDER LAYER ON ALUMINUM EXPOSED PORTION OF TERMINAL WIRE AND METHOD OF MANUFACTURING ELECTRIC MOTOR

CROSS REFERENCE TO RELATED APPLICATION

This application is a U.S. national stage application of PCT/JP2014/081342 filed on Nov. 27, 2014, the contents of which are incorporated herein by reference.

TECHNICAL FIELD

The present invention relates to an electric motor and a method of manufacturing an electric motor.

BACKGROUND ART

A copper wire is expensive in comparison with an aluminum wire or other wires. Therefore, the aluminum wire is increasingly used as a stator coil for an electric motor. The electric motor includes a copper terminal configured to electrically connect a terminal wire of the stator coil and an external power supply wire. Herein, when water or other substances enters to come into contact with a joint portion between the copper terminal and the terminal wire of the stator coil in a case where the terminal wire of the stator coil is joined to the copper terminal, galvanic corrosion occurs due to an electrode potential difference between metals. As a result, the aluminum wire having a low electrode potential is corroded.

Therefore, as a method of joining the aluminum wire used as the stator coil and the copper terminal, there have hitherto been adopted, for example, a method of joining a solder using a solder material containing zinc having a small electrode potential difference from aluminum, a method for suppressing corrosion by preventing entry of water, and other methods.

For example, as the method of joining the aluminum wire and the copper terminal, there has been proposed a method of pressure-bonding the aluminum wire with the copper terminal in a state in which the aluminum wire is placed on the copper terminal and of soldering a pressure-bonded portion with the solder containing zinc (see, for example, Patent Literature 1). Further, according to a technology disclosed in Patent Literature 1, a sealing material is provided to the pressure-bonded portion. According to the technology disclosed in Patent Literature 1, the pressure-bonded portion is soldered, and the sealing material is provided to the pressure-bonded portion to prevent water or other substances from coming into contact with the pressure-bonded portion to suppress the corrosion of the aluminum wire and other portions.

Further, there has been proposed a method of joining a copper pin and the aluminum wire with the solder containing zinc, the method including covering the aluminum wire at the joint portion with the solder and covering a portion, not covered with the solder, of the aluminum wire, with a resin (see, for example, Patent Literature 2). As described above, according to a technology disclosed in Patent Literature 2, the portion of the aluminum wire is covered with the solder, whereas the other portion of the aluminum wire is covered with the resin. In this manner, the water or other substances is prevented from entering the joint portion to suppress the corrosion of the aluminum wire or other portions.

CITATION LIST

Patent Literature

Patent Literature 1: Japanese Unexamined Patent Application Publication No. 2013-80682
Patent Literature 2: Japanese Unexamined Patent Application Publication No. 2014-112509

SUMMARY OF INVENTION

Technical Problem

The method of joining the aluminum wire and the copper terminal involves a plurality of steps including a pressure-bonding step for obtaining electrical conductivity, a soldering step for preventing the entrance of the water and other substances, and a step of providing the sealing material. Through the steps described above, the electrical conductivity between the aluminum wire and the copper terminal is ensured, and in addition, water cut-off performance is ensured. As described above, in an embodiment in which the joint portion has the pressure-bonded portion, the soldered portion, the sealing material, and other portions, productivity of the electric motor is lowered to disadvantageously increase manufacturing cost.

The present invention has been made to overcome the problem described above, and an object of the present invention is to provide an electric motor and a method of manufacturing an electric motor, which are capable of improving productivity while more reliably preventing corrosion at a joint portion between a copper terminal and a terminal wire.

Solution to Problem

According to one embodiment of the present invention, there is provided an electric motor including a stator around which an aluminum wire having a resin coating layer formed on a surface of the aluminum wire is wound; and a rotator arranged on an inner side of the stator to be rotatable, the aluminum wire comprising a terminal wire including an aluminum exposed portion, from which the resin coating layer is peeled off to expose an aluminum core wire, the stator comprising a terminal with which the aluminum exposed portion and a power supply wire for use in supplying electric power for rotating the rotator are connected, the terminal electrically conducting the aluminum exposed portion and the power supply wire, and a first solder layer formed on the terminal, covering an entire surface of the aluminum exposed portion, and joining the aluminum exposed portion and the terminal to each other.

Advantageous Effects of Invention

According to the electric motor of one embodiment of the present invention, soldering is performed to cover the entire surface of the portion of the terminal wire, from which the resin coating layer is peeled off. Therefore, the corrosion at a joint portion with the terminal wire can be more reliably prevented. Further, with the soldering, electrical conductivity and water cut-off performance can be both ensured. Thus, productivity can be improved.

DESCRIPTION OF EMBODIMENTS

An electric motor according to Embodiment of the present invention is described with reference to the drawings. Note that, the present invention is not limited to Embodiment described below. Moreover, in the drawings referred to below including FIG. 1, the dimensional relationship between components may be different from the actual ones in some cases.

Embodiment

Figure 1:
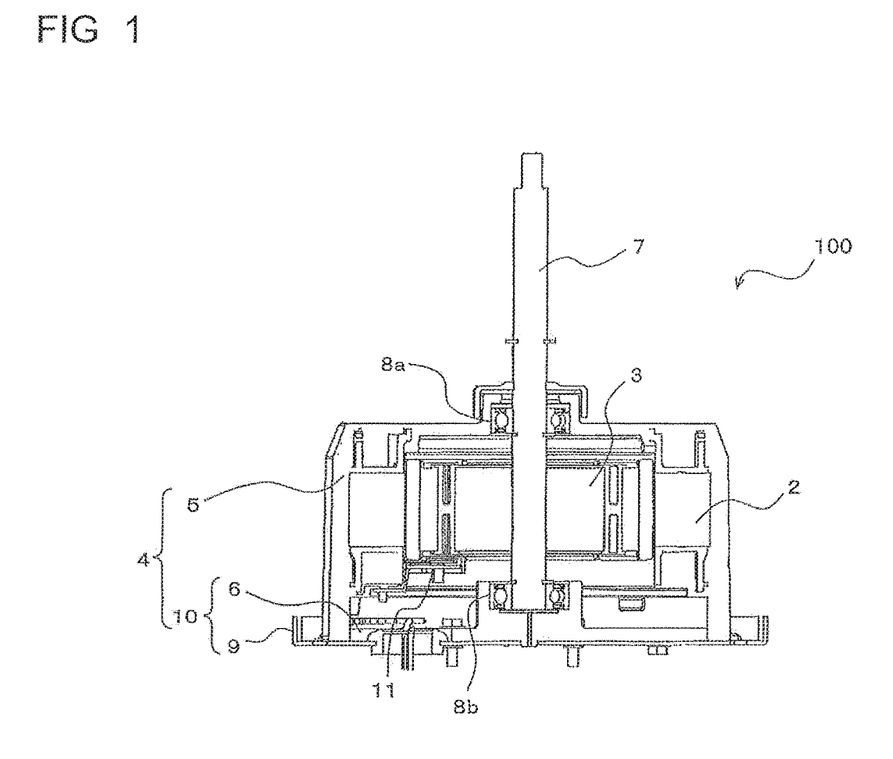
FIG. 1 is a sectional view of an electric motor according to Embodiment of the present invention.
Figure 2:
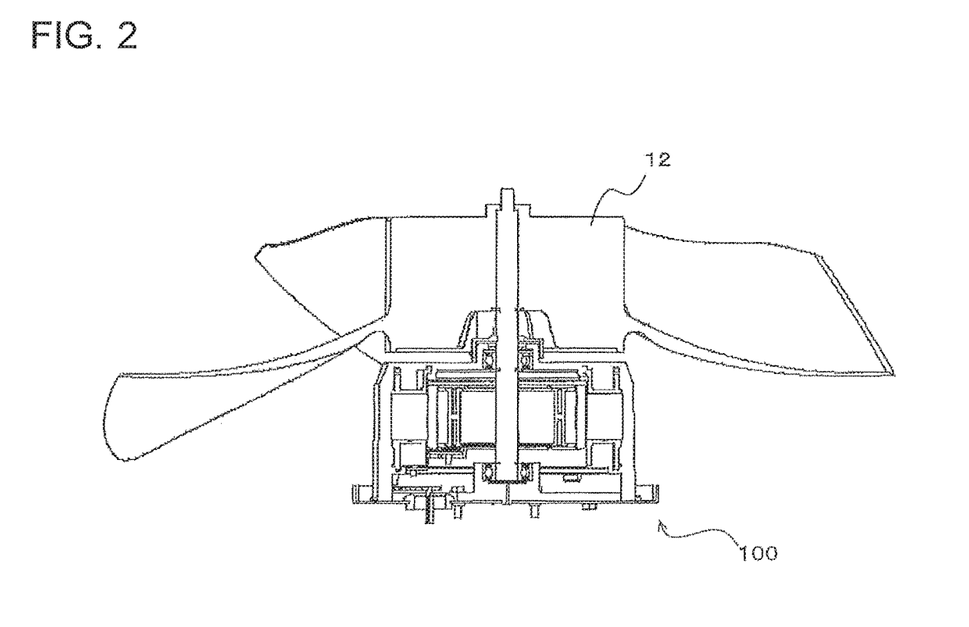
FIG. 2 is a sectional view of a state in which a propeller fan being a driven machine is coupled to the electric motor illustrated in FIG. 1.

FIG. 1 is a sectional view of an electric motor 100 according to Embodiment of the present invention. FIG. 2 is a sectional view of a state in which a propeller fan 12 being a driven machine is coupled to the electric motor 100 illustrated in FIG. 1. With reference to FIG. 1 and FIG. 2, an example of a schematic configuration of the electric motor 100 is described.

The electric motor 100 according to Embodiment is improved to enable more reliable suppression of corrosion at a joint portion between a copper terminal and a terminal wire of a stator coil while improving productivity.

[Configuration of Rotating Electric Machine 100]

The following describes, as an example, a case where the electric motor 100 is a brushless DC motor. Further, in Embodiment, a mode is described in which the electric motor 100 is configured to drive the propeller fan 12 of an outdoor unit of an air-conditioning apparatus as an example.

The electric motor 100 includes a stator 2 having a cylindrical shape and a motor housing 4, in which an accommodating space configured to accommodate a rotator 3 is formed. The motor housing 4 includes a casing 5 having a bottomed cylindrical shape and a bracket cover 10 including a bearing housing 6 and a sheet metal cover 9, which are configured to cover an open side of the casing 5. In the motor housing 4, the casing 5 and the stator 2 are integrally molded with a molding resin so that an inner peripheral surface of the stator 2 is exposed inside the casing 5. The rotator 3 is arranged on an inner side of the stator 2 so that an outer peripheral surface thereof is opposed to the inner peripheral surface of the stator 2. The stator 2 and the rotator 3 are arranged coaxially.

A shaft 7 is connected to the rotator 3 by press-fitting. Further, a distal end of the shaft 7 is coupled to the propeller fan 12. The shaft 7 is supported on the motor housing 4 through a pair of bearings 8 to be rotatable. The pair of bearings 8 is held by bearing holding portions. Specifically, one bearing 8a is mounted to a bottom wall portion of the casing 5. An other bearing 8b is mounted to the bearing housing 6 made of a resin, which is mounted to the bracket cover 10.

As the molding resin that forms the casing 5 and the bearing housing 6, for example, a thermoset resin such as unsaturated polyester can be adopted. Further, a printed board 11, on which a Hall element configured to detect a magnet pole position of the rotator 3 is mounted, is included in the electric motor 100. The printed board 11 is fixed to a printed board holder by, for example, welding. The printed board holder is arranged, for example, between an end surface of the rotator 3 and the bearing housing 6.

[Stator 2]

Figure 3:
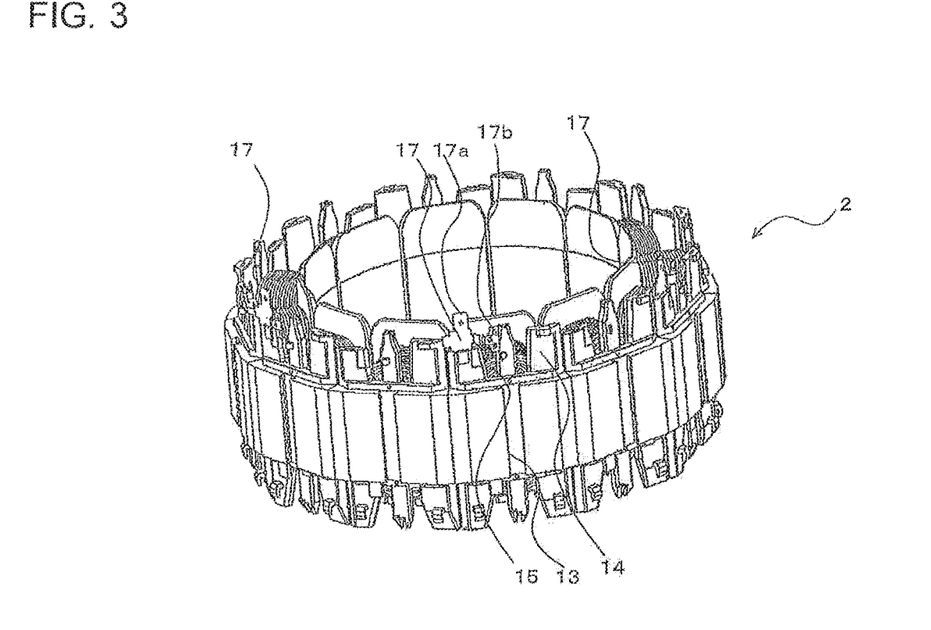
FIG. 3 is a perspective view of a stator before molding of the electric motor according to Embodiment of the present invention.
Figure 4:
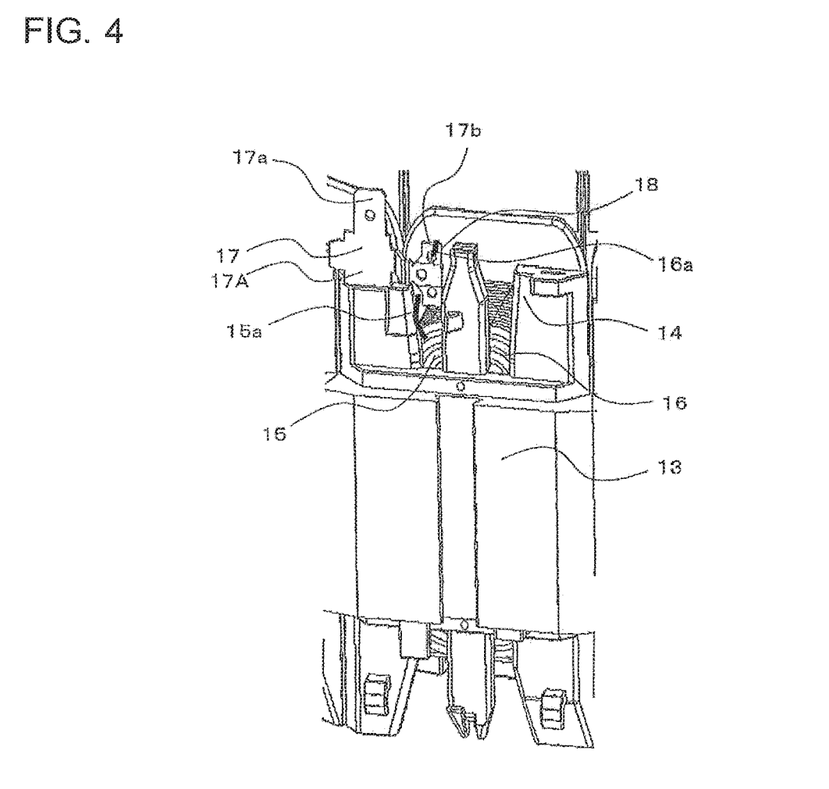
FIG. 4 is an enlarged view of an outer peripheral side portion of the stator before the molding of the electric motor according to Embodiment of the present invention.

FIG. 3 is a perspective view of the stator 2 before molding of the electric motor 100 according to Embodiment. FIG. 4 is an enlarged view of an outer peripheral side portion of the stator 2 before the molding of the electric motor 100 according to Embodiment. With reference to FIG. 3 and FIG. 4, a configuration of the stator 2 before the resin molding and other configurations are described.

The stator 2 of the electric motor 100 includes a stator core 13, insulators 14 fitted to the stator core 13, and coils 15 respectively wound around the insulators 14. For example, the stator core 13 can be formed by, for example, arranging a plurality of pole pieces in an annular fashion. The insulators 14 are used for insulation between the adjacent coils 15. The coil 15 is an aluminum wire including an aluminum core wire and a resin coating layer formed on a surface of the aluminum core wire. Herein, the coil 15 has a terminal wire 15a from which the resin coating layer is peeled off to expose the aluminum core wire. A portion of the terminal wire 15a of the coil 15, in which the aluminum core wire is exposed, corresponds to an aluminum exposed portion 16a. The aluminum exposed portion 16a is joined to a terminal 17 described later with a first solder described later. The coil 15 having a diameter of, for example, 0.9 mm or larger is used.

The stator 2 of the electric motor 100 includes the terminal 17 to be fixed at a preset position on the insulator 14. To the terminal 17, the aluminum exposed portion 16a of the terminal wire 15a, from which the resin coating layer is peeled off, is joined, and a power supply wire (not shown) used to supply electric power for rotating the rotator 3 is joined. Specifically, the terminal 17 is a member used for electrical conduction between the terminal wire 15a and the power supply wire. The power supply wire is connected to an external power supply configured to operate the electric motor 100.

The terminal 17 includes a base portion 17A connected to the insulator 14, a power supply wire connecting portion 17a through which the power supply wire is tied, and a terminal wire connecting portion 17b through which the terminal wire 15*a* of the coil 15 is tied. The terminal 17 is made of a copper material so that an electric resistance is decreased. On a side of the base portion 17A, which is opposite to a side connected to the insulator 14, the power supply wire connecting portion 17*a* is formed. Further, the terminal wire connecting portion 17*b* is connected to a peripheral edge portion of the base portion 17A. The terminal wire connecting portion 17*b* is formed to extend from a position, at which the peripheral edge portion of the base portion 17A is connected, to a diametrically outside of the stator 2.

A hole into which the power supply wire is inserted is formed in the power supply wire connecting portion 17*a*. Specifically, a flag-shaped terminal is provided to the power supply wire. The flag-shaped terminal is inserted into the hole of the power supply wire connecting portion 17*a* so that the flag-shaped terminal and the power supply wire connecting portion 17*a* are brought into pressure-contact. In this manner, the flag-shaped terminal and the power supply wire connecting portion 17*a* are connected to each other to ensure electrical conduction between the power supply wire and the terminal 17.

The stator 2 has a joint portion 18 at which the aluminum exposed portion 16*a* and the terminal wire connecting portion 17*b* are joined. Specifically, the joint portion 18 includes the aluminum exposed portion 16*a* in which the aluminum core wire is exposed, the terminal wire connecting portion 17*b* of the terminal 17, and the first solder (first solder layer 19) configured to join the aluminum exposed portion 16*a* and the terminal wire connecting portion 17*b* to each other.

[Resin Molding of Stator 2]

Figure 5:
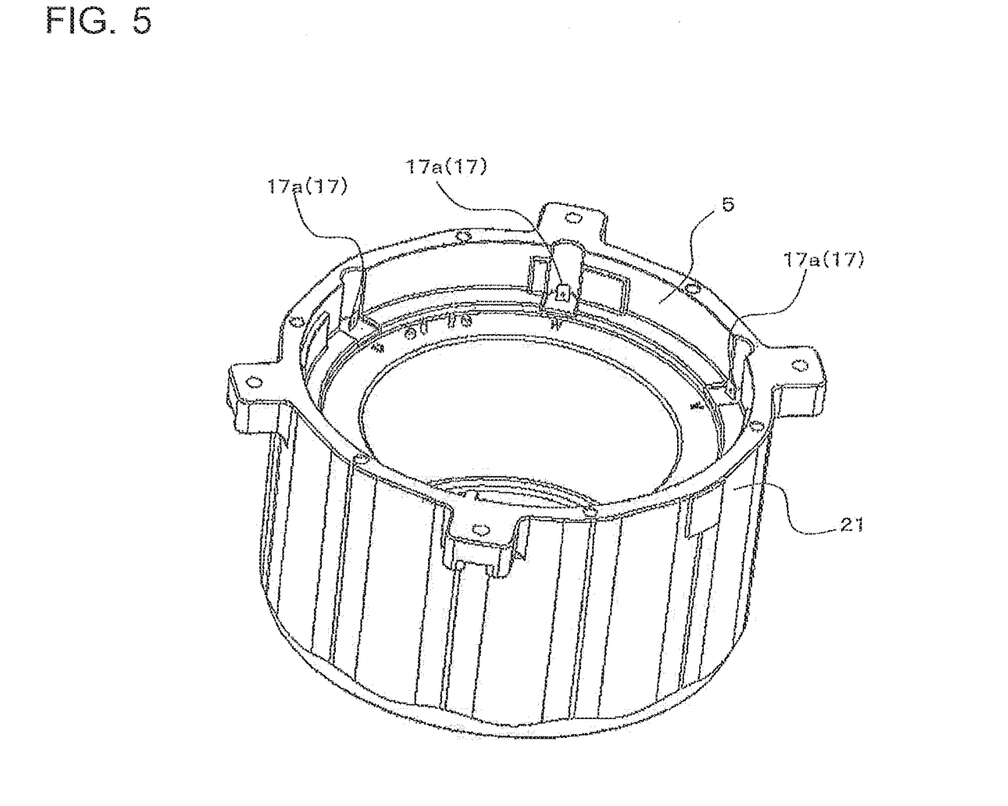
FIG. 5 is a perspective view of the stator after the molding of the electric motor according to Embodiment of the present invention.

FIG. 5 is a perspective view of the stator 2 after being resin-molded. The stator 2 is covered with a resin 21 except for the power supply wire connecting portions 17*a* of the terminals 17. Specifically, of each of the terminals 17, the base portion 17A and the terminal wire connecting portion 17*b* are covered with the resin, whereas the power supply wire connecting portion 17*a* is exposed. Therefore, water or other substances can be prevented from moving into an inside of the resin 21 so that corrosion at the joint portion 18 can be prevented. Under severe conditions in which cooling and superheat are repeated, water sometimes enters into the inside of the resin 21. However, the electric motor 100 according to Embodiment includes the joint portion 18 having the aluminum exposed portion 16*a* covered with the first solder. Therefore, even when water or other substances enter inside the resin 21, the corrosion can be suppressed.

[Joint Portion 18]

Figure 6:
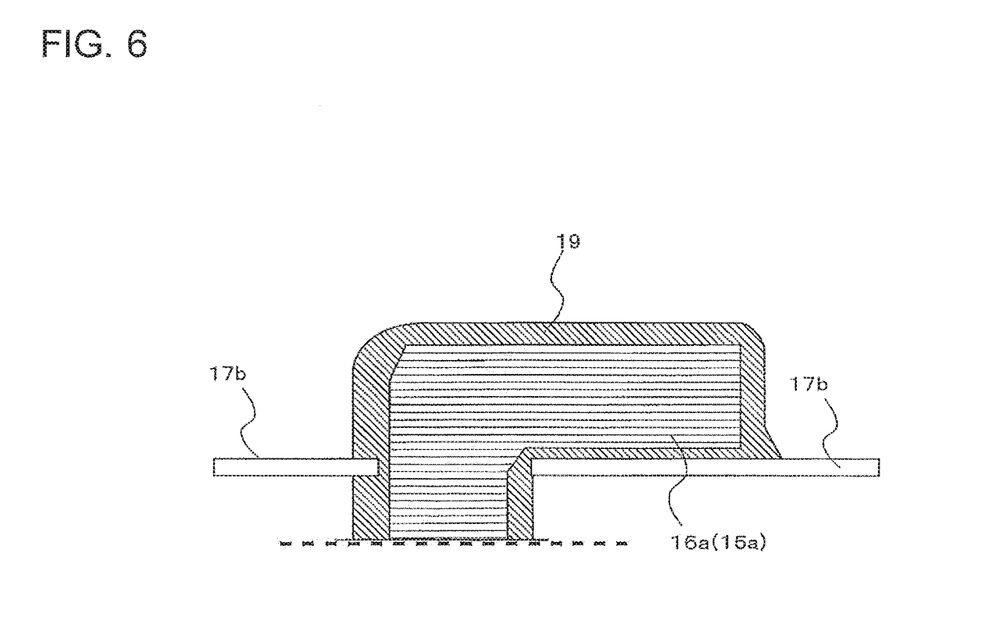
FIG. 6 is a sectional view of a joint portion between a terminal and a terminal wire of an aluminum wire of the electric motor according to Embodiment of the present invention.

FIG. 6 is a sectional view of the joint portion 18 between the terminal 17 and the terminal wire 15*a* of the aluminum wire of the electric motor 100 according to Embodiment. With reference to FIG. 6, and FIG. 3 and FIG. 4 referred to above, the joint portion 18 and other portions are described.

A hole into which the terminal wire 15*a* is inserted is formed in the terminal wire connecting portion 17*b*. The terminal wire 15*a* and the terminal 17 are joined with the first solder in a state in which the terminal wire 15*a* is inserted into the hole of the terminal wire connecting portion 17*b*. Specifically, the terminal 17 has the hole through which the terminal wire 15*a* is threaded and into which the aluminum exposed portion 16*a* of the terminal wire 15*a* is inserted. The first solder layer 19 is formed at a position at which the hole is formed to cover an entire surface of the aluminum exposed portion 16*a*.

The aluminum exposed portion 16*a* and the terminal wire connecting portion 17*b* are covered with the first solder containing zinc (Zn) and silver (Ag) each at less than 0.1% in percent by mass and containing copper (Cu) at less than 1.0% in percent by mass. Specifically, the joint portion 18 includes the first solder layer 19 made of the first solder for joining the aluminum exposed portion 16*a* and the terminal wire connecting portion 17*b*. At the joint portion 18, the entire surface of the aluminum exposed portion 16*a* is covered. Therefore, water cut-off performance is maintained to suppress the corrosion of the aluminum exposed portion 16*a*.

[Method of Manufacturing Electric Motor 100]

A method of manufacturing the electric motor 100 is now described. The method of manufacturing the electric motor 100 includes a winding step, a peeling step, a threading step, a flux applying step, a joining step, and a solder-layer covering step.

The winding step is a step in which the aluminum wire (coil 15) covered with the resin coating is wound around the stator 2. The peeling step is carried out after the winding step. In the peeling step, the resin coating of the terminal wire 15*a* of the aluminum wire (coil 15) is peeled off to expose the aluminum core wire. The threading step is carried out after the peeling step. In the threading step, the terminal wire 15*a* is threaded through the terminal 17 made of the copper material to be connected with the terminal 17.

After the threading step, the flux applying step is carried out. The flux applying step is a step in which a flux is applied onto the terminal wire 15*a* and the terminal 17. Through the flux applying step, a surface tension of the first solder can be decreased to facilitate the soldering. Further, dirt on a surface of the aluminum exposed portion 16*a* and a surface of the terminal 17 can be removed, and oxidation during the soldering can be suppressed by covering surfaces of the surface of the aluminum exposed portion 16*a* and the surface of the terminal 17.

After the flux applying step, the joining step is carried out. The joining step is a step in which the aluminum exposed portion 16*a* and the terminal 17 are joined to each other by covering the entire surface of the aluminum exposed portion 16*a* of the terminal wire 15*a* with the first solder containing zinc at less than 0.1% in percent by mass and silver at less than 0.1% in percent by mass. In the joining step, the first solder layer 19 is formed to cover the entire surface of the aluminum exposed portion 16*a* to achieve both the electrical conduction between the coil 15 and the external power supply wire and the suppression of contact of water with the aluminum exposed portion 16*a*. Specifically, with the joining step alone, the electrical conduction and the water cut-off can be achieved. Thus, for the manufacture of the electric motor 100, the productivity can be further improved.

In the joining step, it is also possible to join the aluminum exposed portion 16*a* of the terminal wire 15*a* and the terminal 17 to each other by using an ultrasonic soldering technique. With the ultrasonic soldering technique, for example, a soldering iron is ultrasonically oscillated to carry out the soldering. Thus, even without the flux, dirt on the aluminum exposed portion 16*a* and the terminal 17 and other substances can be removed. Therefore, when the ultrasonic soldering technique is used in the joining step, the flux applying step can be omitted. Therefore, for the manufacture of the electric motor 100, the productivity can be further improved.

[Resistance-Value Change Test for Joint Portion 18]

Figure 7:
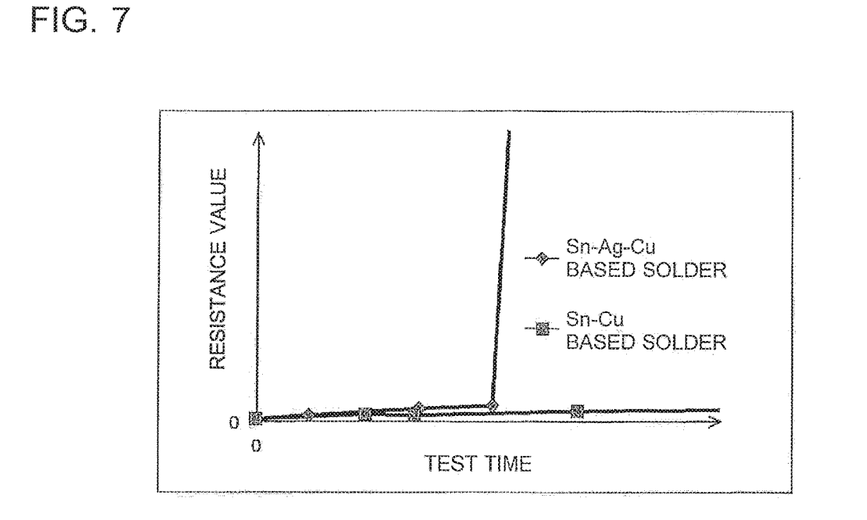
FIG. 7 is a graph for showing a change in resistance value at the joint portion between the terminal and the terminal wire of a coil when a salt spray test is carried out for the joint portion.

FIG. 7 is a graph for showing a change in resistance value of the joint portion 18 when a salted-water spray test is carried out for the joint portion 18 between the terminal 17 and the terminal wire 15*a* of the coil 15. In a case where a solder containing silver having a large electrode potential difference from Al, when an uncovered portion that is not covered with the solder is generated, the aluminum core wire is quickly corroded and a contact resistance greatly increases.

Through use of the first solder that is a Sn—Cu based solder not containing silver as in Embodiment, progression of corrosion is suppressed an increase in resistance value of the joint portion 18. Therefore, even if the uncovered portion in which the aluminum core wire is not covered with the first solder is generated due to inconsistency in the manufacturing steps in the method of manufacturing the electric motor 100, the corrosion is less liable to progress at the joint portion 18.

Modification Example 1

Figure 8:
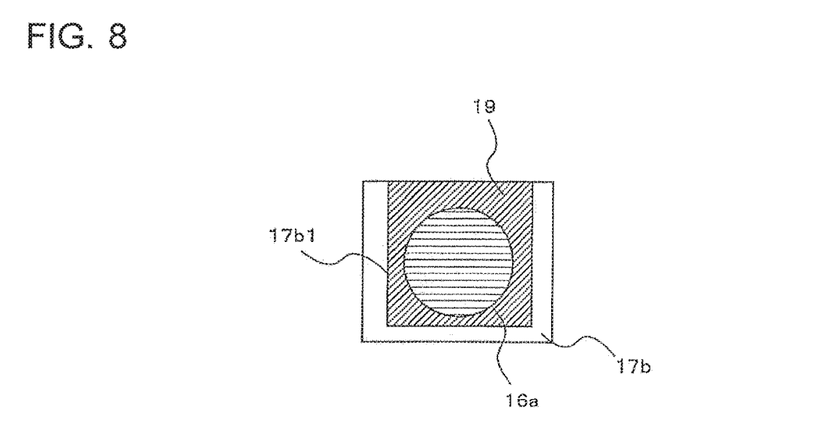
FIG. 8 is a sectional view when a groove portion is formed in a terminal wire connecting portion in place of a hole and an aluminum exposed portion is covered with a first solder.
Figure 9:
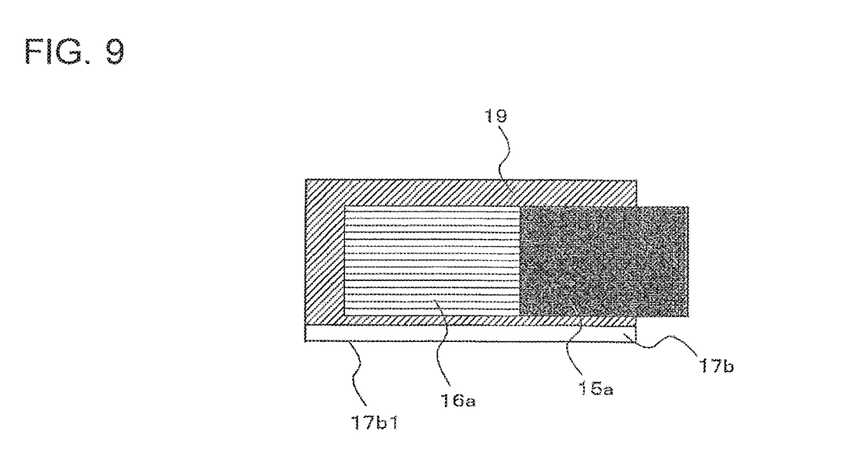
FIG. 9 is a sectional view of FIG. 8 as viewed from a side surface.

FIG. 8 is a sectional view in a case where a groove portion 17b1 is formed in the terminal wire connecting portion 17b in place of the hole and the aluminum exposed portion 16a is covered with the first solder. FIG. 9 is a sectional view of FIG. 8 as viewed from a side surface.

The groove portion 17b1 in which the aluminum exposed portion 16a is to be placed may be formed on the terminal wire connecting portion 17b to further prevent the generation of the uncovered portion of the aluminum exposed portion 16a. As a result, the aluminum exposed portion 16a can be threaded through the groove portion 17b1 without forming the hole in which the aluminum exposed portion 16a is threaded in the terminal wire connecting portion 17b of the terminal 17. Then, in a state in which the aluminum exposed portion 16a is threaded through the groove portion 17b1, the soldering is performed with the first solder. At this time, as illustrated in FIG. 8 and FIG. 9, soldering is performed with the first solder to fill the groove portion 17b1 with the first solder. Because of the formation of the groove portion 17b1, an operator who performs the soldering can easily fill the groove portion 17b1 with the first solder. Then, the entire surface of the aluminum exposed portion 16a is covered through filling of the groove portion 17b1 with the first solder. Thus, the corrosion of the aluminum exposed portion 16a can be more reliably suppressed.

Modification Example 2

Figure 10:
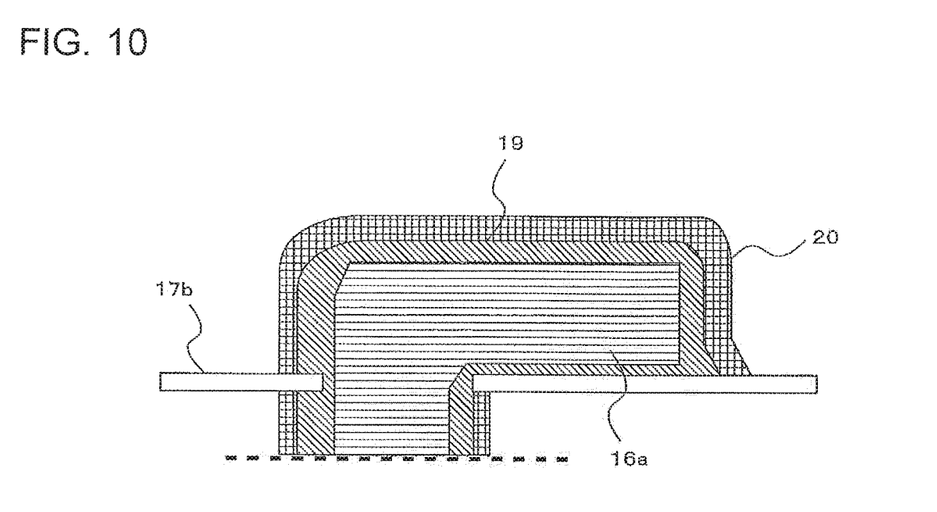
FIG. 10 is a sectional view of the joint portion when soldering is performed with two kinds of solders having different melting points.

FIG. 10 is a sectional view of the joint portion 18 when the soldering is performed with two kinds of solders having different melting points. Further, after the soldering using the first solder, the soldering may be further performed with a second solder having a lower melting point than a melting point of the first solder. In Modification Example 2, as illustrated in FIG. 10, the joint portion 18 of the stator 2 further includes a second solder layer 20 formed on a surface of the first solder layer 19, which has a lower melting point than a melting point of the first solder layer 19.

In this case, the method of manufacturing the electric motor 100 may further include a solder-layer covering step. Specifically, after the joining step, the soldering may be performed with the second solder having a lower melting point than that of the first solder to cover the first solder layer 19 formed through solidification of the first solder to form the second solder layer 20 at the joint portion 18.

[Effects of Electric Motor 100 According to Embodiment]

The electric motor 100 is sometimes used under the severe conditions in which cooling and heating are repeated. For example, a case is conceived in which the electric motor 100 is applied to a fan to be mounted in the outdoor unit of the air-conditioning apparatus. In the outdoor unit, a heat exchanger configured to function as a condenser or an evaporator is installed. Further, rainwater or other substances sometimes come into contact therewith depending on a position of installation. Under such a condition, water sometimes enters into the inside of the resin mold of the stator 2.

In the electric motor 100 according to Embodiment, the entire surface of the aluminum exposed portion 16a of the joint portion 18 is covered with the first solder. Therefore, even when the water enters into the inside of the resin mold, the corrosion can be more reliably suppressed. Further, through soldering with the first solder, both the electrical conductivity and the water cut-off performance at the joint portion 18 can be ensured, thereby improving the productivity of the electric motor 100.

In the electric motor 100 according to Embodiment, even when the portion that is not covered with the first solder is generated, the terminal 17 is joined with the first solder having a small silver content having a large potential difference from aluminum. Thus, a speed of corrosion can be decreased.

In the electric motor 100 according to Embodiment, the first solder used for the joint at the joint portion 18 is the Sn—Cu based solder containing a large amount of Sn having a relatively small electrode potential difference from Al and containing copper at less than 1% in percent by mass. Thus, the speed of corrosion can be further decreased.

In the electric motor 100 according to Embodiment, the joint portion 18 is joined with the first solder having a small zinc content to prevent a corrosion resistance of the solder itself from being decreased. Thus, the corrosion can be more reliably suppressed.

In the electric motor 100 according to Embodiment, the electrical conductivity between the terminal 17 and the aluminum exposed portion 16a and the water cut-off performance at the joint portion 18 can be obtained with the step of soldering the terminal 17 and the aluminum exposed portion 16a alone. Thus, the productivity is improved.

REFERENCE SIGNS LIST

2 stator 3 rotator 4 motor housing 5 casing 6 bearing housing 7 shaft 8 bearing 8a bearing 8b bearing 9 sheet metal cover 10 bracket cover 11 printed board 12 propeller fan 13 stator core 14 insulator 15 coil 15a terminal wire 16a aluminum exposed portion 17 terminal 17A base portion 17a power supply wire connecting portion 17b terminal wire connecting portion 17b1 groove portion 18 joint portion 19 first solder layer 20 second solder layer 100 electric motor

The invention claimed is:

1. An electric motor comprising:
   a stator around which an aluminum wire having a resin coating layer formed on a surface of the aluminum wire is wound; and
   a rotator arranged on an inner side of the stator to be rotatable,
   the aluminum wire comprising a terminal wire including an aluminum exposed portion, from which the resin coating layer is peeled off to expose an aluminum core wire,
   the stator comprising
   a terminal with which the aluminum exposed portion and a power supply wire for use in supplying electric power for rotating the rotator are connected, the terminal electrically conducting the aluminum exposed portion and the power supply wire, and a first solder layer formed directly on the terminal, covering an entirety of the aluminum exposed portion, and directly joining the aluminum exposed portion and the terminal to each other, wherein the terminal has a hole through which the aluminum exposed portion is inserted, the aluminum exposed portion being disposed in the hole, an end portion of the aluminum exposed portion has a bend and lies along a surface of the terminal, the first solder layer covers the entirety of the aluminum exposed portion, and the first solder layer is sandwiched directly between the terminal and the end portion of the aluminum exposed portion, and fills an entire gap between the terminal and an outer periphery of the aluminum exposed portion in the hole of the terminal.

2. The electric motor of claim 1, further comprising a second solder layer formed on a surface of the first solder layer, the second solder layer having a lower melting point than a melting point of the first solder layer.

3. The electric motor of claim 1, wherein
the terminal has a groove portion through which the aluminum exposed portion is threaded and in which the aluminum exposed portion is placed, and
the groove portion is filled with a solder for forming the first solder layer, the first solder layer covering the entirety of the aluminum exposed portion.

4. The electric motor of claim 1, wherein
the terminal is made of a copper material, and
the first solder layer is made of a solder containing zinc at less than 0.1% in percent by mass and silver at less than 0.1% in percent by mass.

5. The electric motor of claim 4, wherein the first solder layer is made of a Sn—Cu based solder containing copper at less than 0.1% in percent by mass.

6. The electric motor of claim 1, wherein the aluminum wire has a diameter of 0.9 mm or larger.

7. The electric motor of claim 1, wherein the first solder layer covers a sidewall of the hole formed in the terminal and all sides of the terminal located directly adjacent to an outer peripheral edge of the hole.

8. A method of manufacturing an electric motor, which comprises a stator including a copper terminal with which a power supply wire for use in supplying electric power for rotating a rotator is connected, the method comprising:

winding an aluminum wire covered with a resin coating around the stator;

peeling the resin coating of a terminal wire of the aluminum wire to expose an aluminum core wire;

threading the terminal wire with the copper terminal; and joining the terminal wire and the copper terminal by covering an entirety of the aluminum core wire of the terminal wire, directly on the aluminum exposed portion, with a first solder containing zinc at less than 0.1% in percent by mass and silver at less than 0.1% in percent by mass, wherein the method further comprises forming a hole through the copper terminal, the aluminum exposed portion is threaded through the hole and the aluminum exposed portion is inserted into the hole, the aluminum exposed portion being disposed in the hole, bending an end portion of the aluminum exposed portion to be laid along the copper terminal, and forming a first solder layer sandwiched directly between the copper terminal and the end portion of the aluminum exposed portion, and the first solder layer fills an entire gap between the copper terminal and an outer periphery of the aluminum exposed portion in the hole of the copper terminal in a state in which the aluminum exposed portion is inserted to the hole of the copper terminal, to cover the entirety of the aluminum exposed portion.

9. The method of claim 8, further comprising a step of applying a flux onto the terminal wire and the copper terminal, the step being carried out between the threading step and the joining stop.

10. The method of claim 8, wherein the joining step comprises joining the terminal wire and the copper terminal by using an ultrasonic soldering technique.

11. The method of claim 8, further comprising a solder-layer covering step of performing soldering with a second solder having a lower melting point than a melting point of the first solder to cover a solder layer formed through solidification of the first solder.

12. The method of claim 8, wherein the first solder layer covers a sidewall of the hole formed in the terminal and all sides of the terminal located directly adjacent to an outer peripheral edge of the hole.

13. An electric motor, comprising:
a stator around which an aluminum wire having a resin coating layer formed on a surface of the aluminum wire is wound; and
a rotator arranged on an inner side of the stator to be rotatable,
the aluminum wire comprising a terminal wire including an aluminum exposed portion, from which the resin coating layer is peeled off to expose an aluminum core wire,
the stator comprising
a terminal with which the aluminum exposed portion and a power supply wire for use in supplying electric power for rotating the rotator are connected, the terminal electrically conducting the aluminum exposed portion and the power supply wire, the terminal including a power supply wire connection portion with which the power supply wire is connected,
a first solder layer formed directly on the terminal to cover an entirety of the aluminum exposed portion, the first solder layer being configured to directly join the aluminum exposed portion and the terminal to each other, and
a resin layer coating the stator except for the power supply wire connection portion of the terminal, wherein
the terminal has a hole through which the aluminum exposed portion is inserted, the aluminum exposed portion being disposed in the hole,
an end portion of the aluminum exposed portion has a bend and lies along a surface of the terminal,
the first solder layer covers the entirety of the aluminum exposed portion, and
the first solder layer is sandwiched directly between the terminal and the end portion of the aluminum exposed portion, and fills an entire gap between the terminal and an outer periphery of the aluminum exposed portion in the hole of the terminal.

14. The electric motor of claim 13, further comprising a second solder layer formed on a surface of the first solder layer, the second solder layer having a lower melting point than a melting point of the first solder layer.

15. The electric motor of claim 13, wherein
the terminal has a groove portion through which the aluminum exposed portion is threaded and in which the aluminum exposed portion is placed, and the groove portion is filled with a solder for forming the first solder layer, the first solder layer covering the entirety of the aluminum exposed portion.

16. The electric motor of claim 13, wherein
the terminal is made of a copper material, and
the first solder layer is made of a solder containing zinc at less than 0.1% in percent by mass and silver at less than 0.1% in percent by mass.

17. The electric motor of claim 16, wherein the first solder layer is made of a Sn—Cu based solder containing copper at less than 0.1% in percent by mass.

18. The electric motor of claim 13, wherein the aluminum wire has a diameter of 0.9 mm or larger.

19. The electric motor of claim 13, wherein the first solder layer covers a sidewall of the hole formed in the terminal and all sides of the terminal located directly adjacent to an outer peripheral edge of the hole.

* * * * *